United States Patent
Elkady et al.

(10) Patent No.: US 8,165,139 B2
(45) Date of Patent: Apr. 24, 2012

(54) SYSTEMS, METHODS, AND COMPUTER-READABLE MEDIA FOR COMMUNICATING VIA A MOBILE WIRELESS COMMUNICATION DEVICE

(75) Inventors: Amr Elkady, Atlanta, GA (US); Barbara Helen Stark, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 792 days.

(21) Appl. No.: 11/956,465

(22) Filed: Dec. 14, 2007

(65) Prior Publication Data

US 2008/0232336 A1    Sep. 25, 2008

Related U.S. Application Data

(60) Provisional application No. 60/919,353, filed on Mar. 22, 2007.

(51) Int. Cl.
*H04L 12/28* (2006.01)
*H04L 12/56* (2006.01)
(52) U.S. Cl. ........................................ 370/401
(58) Field of Classification Search .................. 370/401, 370/911, 913
See application file for complete search history.

(56) References Cited

U.S. PATENT DOCUMENTS

| | | | |
|---|---|---|---|
| 6,411,802 B1 | 6/2002 | Cardina et al. | |
| 2002/0087722 A1* | 7/2002 | Datta et al. | 709/239 |
| 2002/0095484 A1 | 7/2002 | Pagani et al. | |
| 2004/0004968 A1 | 1/2004 | Nassar | |
| 2004/0179512 A1* | 9/2004 | Leblanc et al. | 370/352 |
| 2005/0111398 A1 | 5/2005 | Wybenga et al. | |
| 2006/0077921 A1 | 4/2006 | Radpour | |
| 2006/0098614 A1* | 5/2006 | Moon et al. | 370/338 |
| 2006/0182111 A1* | 8/2006 | Wahl | 370/392 |
| 2007/0025246 A1* | 2/2007 | Pirzada et al. | 370/230 |
| 2007/0104169 A1* | 5/2007 | Polson | 370/338 |
| 2007/0249323 A1 | 10/2007 | Lee et al. | |
| 2007/0253417 A1* | 11/2007 | Purnadi et al. | 370/392 |
| 2007/0254634 A1* | 11/2007 | Costa-Requena et al. | 455/412.1 |
| 2008/0008125 A1* | 1/2008 | Pham et al. | 370/329 |
| 2008/0049623 A1 | 2/2008 | Qiu et al. | |

OTHER PUBLICATIONS

U.S. Appl. No. 11/956,474, filed Dec. 14, 2007, entitled: "Systems, Methods, and Computer-Readable Media for Managing Mobile Wireless Devices", Inventor: Amr Elkady.
International Search Report dated Apr. 9, 2008 in International Application No. PCT/US07/87562.
U.S. Official Action dated Mar. 2, 2011 in U.S. Appl. No. 11/956,474.
Bernstein et al, entitled "Technical Report DSL Forum TR-069 CPE WAN Management Protocol," dated May 2004; 109 pages.
U.S. Official Action dated Sep. 16, 2010 in U.S. Appl. No. 11/956,474.
Official Action dated Jun. 23, 2011 in U.S. Appl. No. 11/956,474.
U.S. Office Action dated Feb. 1, 2012 in U.S. Appl. No. 11/956,474.

* cited by examiner

*Primary Examiner* — Jeffrey Pwu
*Assistant Examiner* — Scott M Sciacca
(74) *Attorney, Agent, or Firm* — Hope Baldauff Hartman, LLC (57) ABSTRACT

Methods, systems, and computer-readable media are provided for communicating via a mobile wireless communication device (MWCD). According to exemplary embodiments, a message is generated for a customer premises equipment located at a customer premises. The message is provided to the customer premises equipment via a mobile wireless communication device located at the customer premises.

15 Claims, 9 Drawing Sheets

SYSTEMS, METHODS, AND COMPUTER-READABLE MEDIA FOR COMMUNICATING VIA A MOBILE WIRELESS COMMUNICATION DEVICE

CROSS-REFERENCE TO RELATED APPLICATIONS

This patent application claims priority to U.S. provisional application having Ser. No. 60/919,353, entitled "Systems, Methods, and Computer-Readable Media for Managing Dual-Mode User Equipment for Fixed/Mobile Convergence and for Utilizing Dual-Mode User Equipment for Home Network Access," filed Mar. 22, 2007 which is hereby incorporated herein by reference in its entirety.

TECHNICAL FIELD

This application relates generally to the field of telecommunications. More specifically, this application relates to systems and methods for communicating via a mobile wireless communication device.

BACKGROUND

Communication service providers often provide communication services for use with various customer premises equipment (CPE) located at a customer premises. The CPE may include, for example, land-line telephones, wireless gateways, and computers. The services provided by a communication service provider in connection with the CPE may include, for example, home telephone service, voice over internet protocol (VoIP), and broadband Internet access, such as via digital subscriber line (DSL) and/or cable modem technology. When a CPE or an external communication channel (e.g., DSL) used by the CPE is not functioning properly, the communication service provider may be required to send a technician to the customer premises to diagnose and fix the problem. Sending a technician to the customer premises, however, is time consuming and expensive.

SUMMARY

Systems, methods, and computer program products for communicating via a mobile wireless communication device are provided. Exemplary embodiments include a method for communicating via a mobile wireless communication device located at a customer premises. A message for a customer premises equipment located at the customer premises is generated. The message is provided to the customer premises equipment via the mobile wireless communication device located at the customer premises.

According to further aspects, a server for communicating via a mobile wireless communication device located at a customer premises includes a processor and memory comprising instructions that are executable by the processor. The instructions are configured to enable the server to generate a message for a customer premises equipment located at the customer premises. The instructions are further configured to enable the server to provide the message to the customer premises equipment via the mobile wireless communication device located at the customer premises.

According to additional aspects, a computer-readable storage medium includes instructions configured to enable a server to generate a message for a customer premises equipment located at a customer premises. The instructions are further configured to enable the server to provide the message to the customer premises equipment via a mobile wireless communication device located at the customer premises.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for communicating via a mobile wireless communication device (MWCD). In the following detailed description, references are made to the accompanying drawings that form a part hereof, and which are shown by way of exemplary embodiments and implementations.

According to exemplary embodiments, an MWCD routes messages between a server and a customer premises equipment (CPE). The server may communicate with the CPE for purposes of, for example, auto-configuration and dynamic service provisioning, software and firmware image management, status and performance monitoring, and diagnostics.

Figure 1:
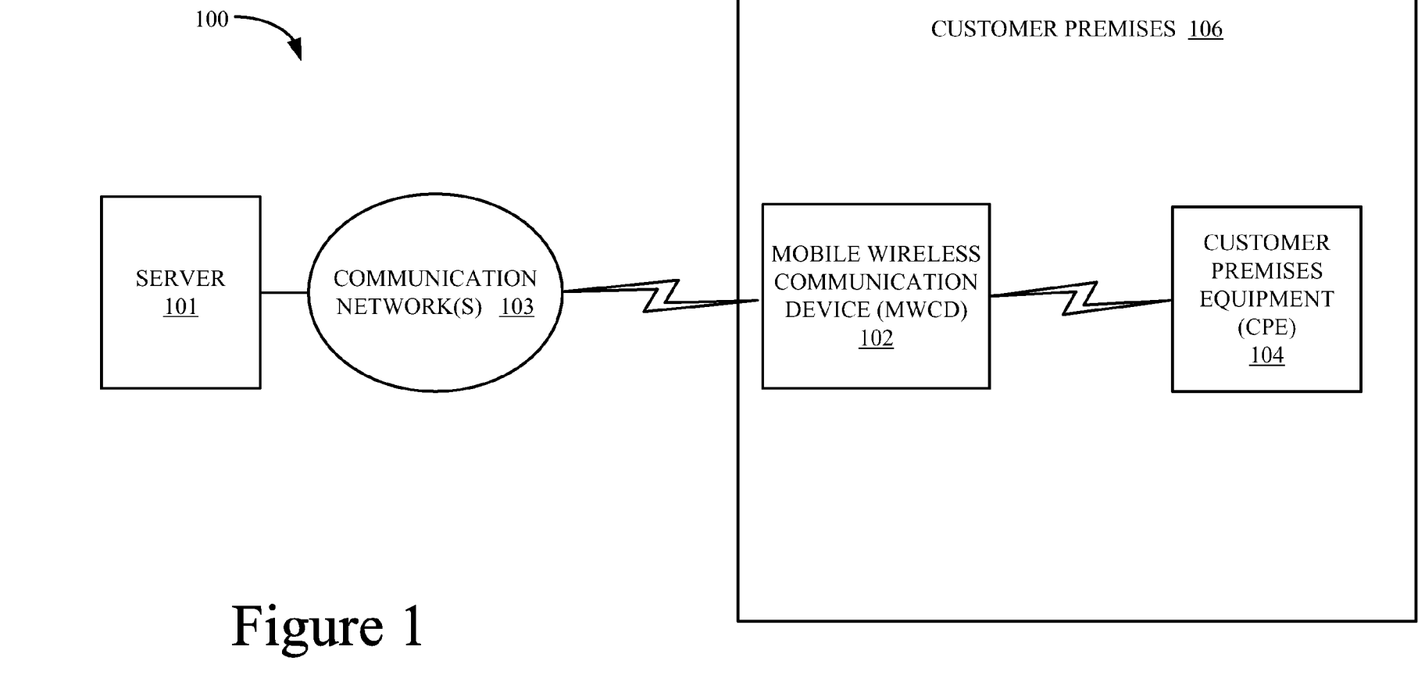
FIG. 1 is a block diagram illustrating a communication system, in accordance with exemplary embodiments.

Referring now to the drawings, it is to be understood that like numerals represent like elements through the several figures, and that not all components and/or steps described and illustrated with reference to the figures are required for all embodiments. FIG. 1 is a block diagram illustrating a communication system 100, in accordance with exemplary embodiments. The communication system 100 includes a server 101 and an MWCD 102 that are coupled via one or more communication network(s) 103. The MWCD 102 and a CPE 104 are located at a customer premises 106. In accordance with exemplary embodiments, the communication network 103 is a mobile wireless network that carries data utilizing internet protocol (IP). According to exemplary embodiments, the communication network 103 transports IP traffic between the server 101 and the CPE 104. The communication network 103 is connected to the server 101 by one or more IP network(s).

According to exemplary embodiments, the MWCD 102 is configured to route communications between the server 101 and the CPE 104. For example, the MWCD 102 may route IP packets to the server 101 using mobile wireless signals, and may route IP packets to the CPE 104 using wireless local area network (LAN) signals. In accordance with exemplary embodiments, the MWCD 102 essentially provides a communication link between the server 101 and the CPE 104. The communication link provided by the MWCD 102 may enable the server 101 and the CPE 104 to establish a communication session.

Note that although only one server 101, one MWCD 102, and one CPE 104 are shown for illustrative purposes, one or more of the severs 101 may be configured to communicate via one or more of the MWCDs 102 and with one or more CPEs 104. Similarly, one or more of the MWCDs 102 may be configured to route communications between one or more of the servers 101 and one or more of the CPEs 104.

According to exemplary embodiments, the server 101 is an auto-configuration server (ACS) or part of an ACS system, the MWCD 102 is a dual-mode user equipment (UE), and the CPE 104 is a wireless home gateway. A dual mode UE may include a mobile phone that is capable of communicating via both a wireless LAN technology (e.g., WiFi) and a mobile wireless technology (e.g., Global System for Mobile Communications (GSM) or Universal Mobile Telecommunications System (UMTS)).

Figure 2:
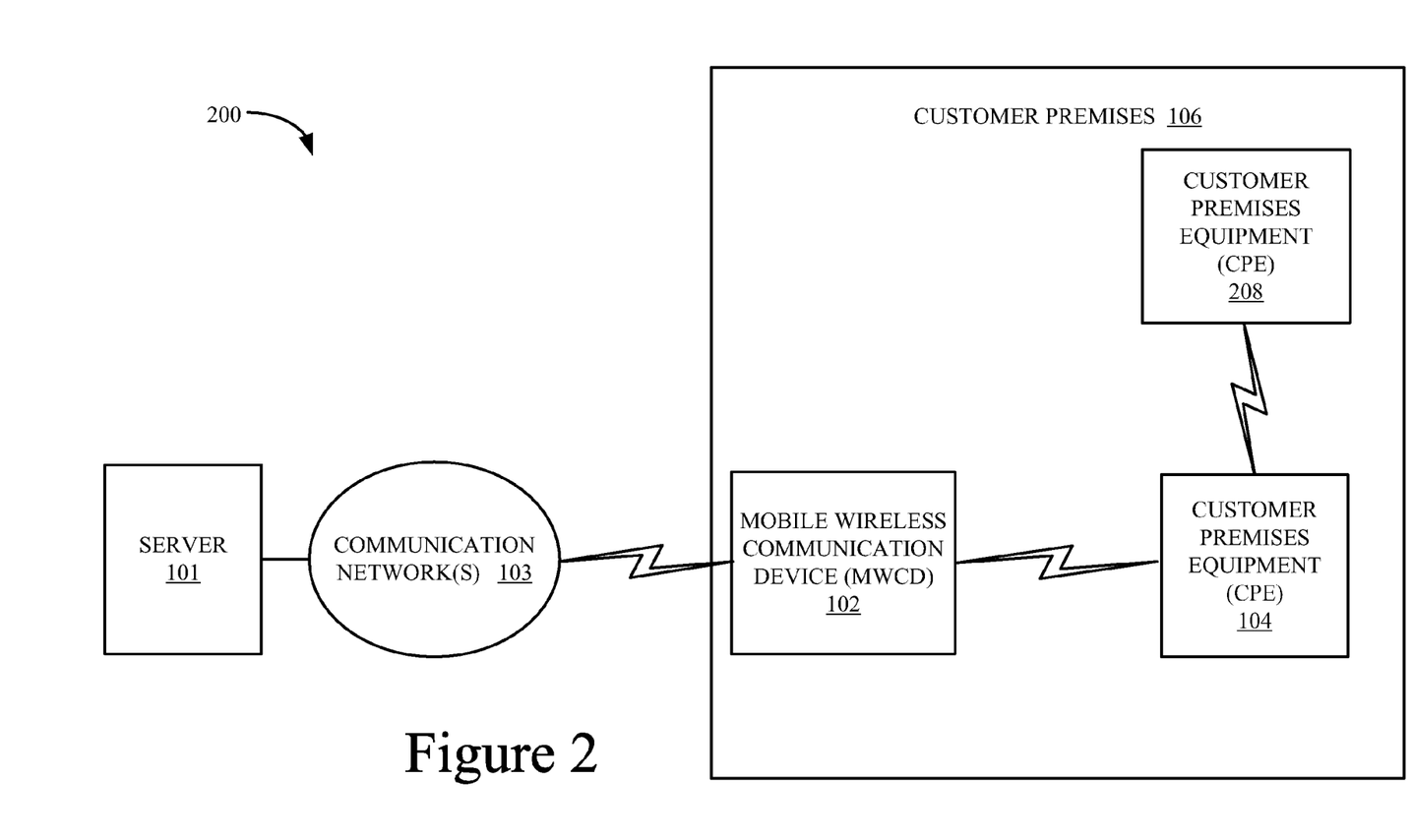
FIG. 2 is a block diagram illustrating another communication system, in accordance with exemplary embodiments.

FIG. 2 is a block diagram illustrating a communication system 200, in accordance with exemplary embodiments. The communication system 200 includes the server 101, the MWCD 102, the CPE 104, and a CPE 208. According to exemplary embodiments, the CPE 104 may be, for example, an Internet gateway device (IGD). The MWCD 102 and the server 101 are coupled via one or more communication network(s), such as the communication network 103. The MWCD 102, the CPE 104, and the CPE 208 are located at the customer premises 106. The CPE 208 may be, for example, a telephone, a computer, a data storage device, a gaming console, or any other device located at the same customer premises and communicatively coupled to the CPE 104. IP packets are wirelessly transmitted over the communication network 103 to the MWCD 102.

According to exemplary embodiments, the MWCD 102 and the CPE 104 route communications between the server 101 and the CPE 208. For example, the MWCD 102 forwards to the CPE 104 IP packets corresponding to messages sent by the server 101 to the CPE 208. The CPE 104 then forwards these IP packets to the CPE 208. Similarly, the CPE 104 forwards to the MWCD 102 IP packets corresponding to messages sent by the CPE 208 to the server 101 according to exemplary embodiments. The MWCD 102 then forwards these IP packets to the server 101. The communication link provided by the MWCD 102 and the CPE 104 enables the CPE 208 and the server 101 to establish a communication session.

With reference to FIGS. 1 and 2, the server 101 uses the MWCD 102 communication link to enable a variety of functionality related to the CPE 104 and/or 208 including, for example, auto-configuration and dynamic service provisioning, software and firmware image management, status and performance monitoring, configuration of local and mobile wireless communication settings, and diagnostics. Furthermore, the server may use the MWCD 102 communication link to enable the CPE 104 and/or 208 to provide features such as voice communications, television, data storage, Web browsing, MP3 music, e-mail, voice over IP (VoIP), and/or text messaging.

The server 101 may use the MWCD 102 communication link to provision the CPE 104 and/or 208 based on a variety of criteria using specific provisioning parameters. Vendor-specific provisioning capabilities may also be implemented by the server 101. The server 101 may use identification mechanisms to provision the CPE 104 and/or 208 based either on the requirements of the specific CPE 104 and/or 208, or based on collective criteria such as the CPE 104 and/or 208 vendor, model, software/firmware version, and/or other criteria. The server 101 may also manage the CPE 104 and/or 208-specific components of optional applications or services for which an additional level of security is required.

According to exemplary embodiments, the server 101 uses the MWCD 102 communication link to manage downloading of the CPE 104 and/or 208 software/firmware image files. The server 101 may provide the CPE 104 and/or 208 with individual files or a package of files along with explicit installation instructions for the CPE 104 and/or 208 to perform. A signed package format can be used to ensure the integrity of downloaded files and the associated installation instructions, allowing authentication of a file source that may be a party other than the server 101 operator.

The server 101 may also use the MWCD 102 communication link to monitor the status and/or performance statistics of the CPE 104 and/or 208. A set of conditions can be specified under which the CPE 104 and/or 208 actively notifies the server 101 of changes related to the CPE 104 and/or 208. Furthermore, the server 101 may use the MWCD 102 communication link to obtain information that can be used to diagnose connectivity or service issues related to the CPE 104 and/or 208.

The server 101 may additionally use the MWCD 102 communication link to enable security functionality while managing the CPE 104 and/or 208. In general terms, security goals may include, for example, preventing theft of service, allowing appropriate authentication for each type of transaction (e.g., between the CPE 104 and/or 208 and the server 101), providing confidentiality for transactions, and preventing tampering with transactions or server 101 management functions.

Either the server 101 or CPE 104 and/or 208 may initiate connection establishment via the MWCD 102 communication link. The functional interactions between the server 101 and the CPE 104 and/or 208 may in some embodiments be independent of which end initiated the establishment of the connection. In particular, even where server-initiated connectivity is not supported, transactions may be able to take place over a connection initiated by the CPE 104 and/or 208. Each connection between the server 101 and the CPE 104 and/or 208 can be used to enable bi-directional transactions to occur over a single connection.

The server 101 may use the MWCD 102 communication link to access, control and/or monitor various parameters associated with the CPE 104 and/or 208. Different CPE 104 and/or 208 may have differing capability levels, implementing different subsets of optional functionality. As a result, the server 101 may be able to discover the capabilities of a particular CPE 104 and/or 208 and to control and monitor a current configuration of the CPE 104 and/or 208. The server 101 may discover the capabilities of the CPE 104 and/or 208 via information provided by the CPEs to the server 101. In addition, the server 101 may discover the capabilities of the CPE 104 and/or 208 based on information received regarding the CPEs such as, for example, the make and model of the CPEs, and/or software/firmware version associated with the CPEs.

Figure 3:
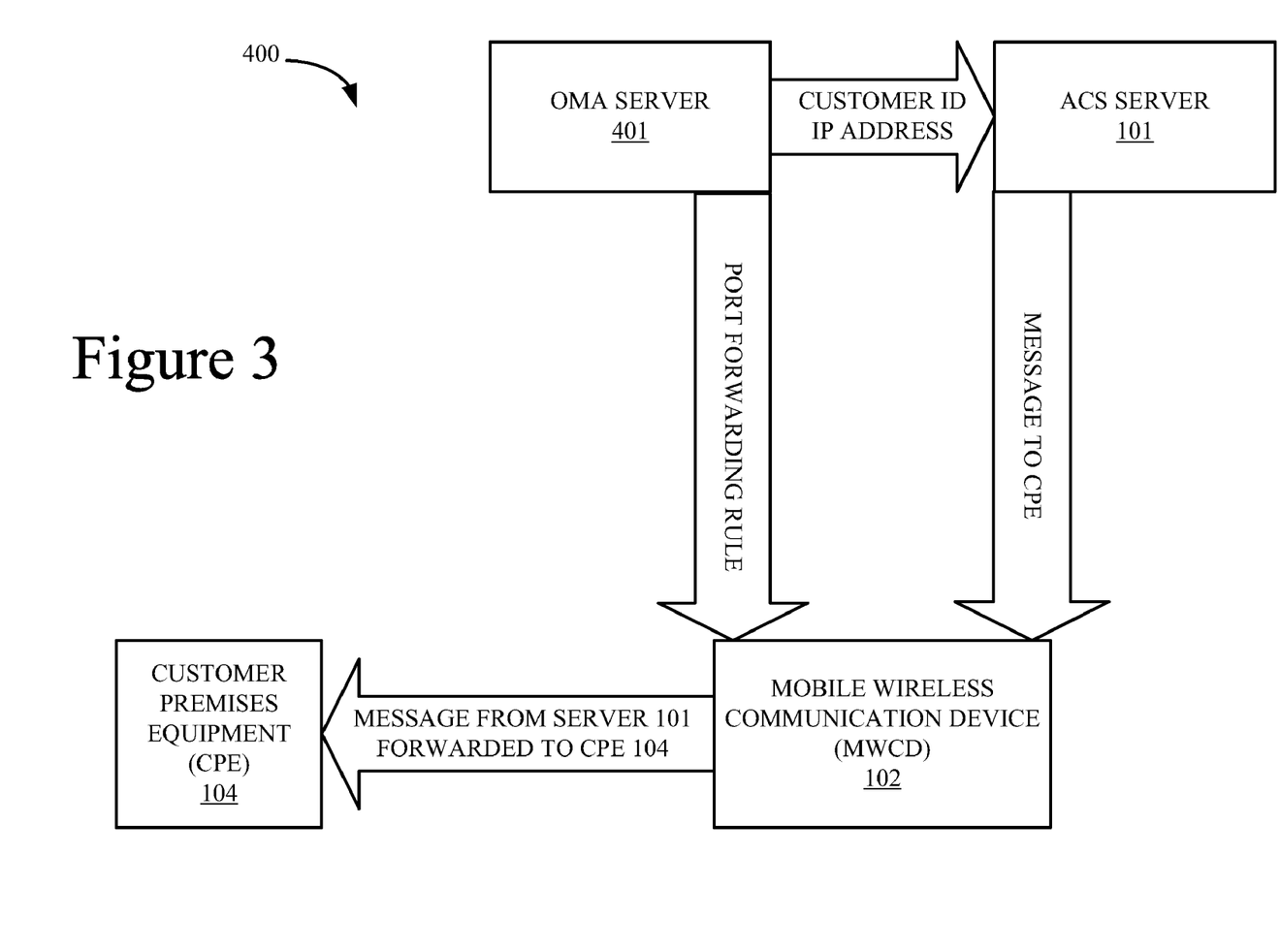
FIG. 3 is a block diagram illustrating a further communication system, in accordance with exemplary embodiments.

FIG. 3 is a block diagram illustrating a communication system 400, in accordance with exemplary embodiments. The communication system 400 includes an Open Mobile Alliance (OMA) server 401, the MWCD 102, the CPE 104, and the server 101, which in this example is an ACS or part of an ACS system. According to exemplary embodiments, the OMA server 401 provides a port forwarding rule to the MWCD 102. The port forwarding rule is configured to enable the MWCD 102 to forward to the CPE 104 IP packets corresponding to a message transmitted by the server 101. The port forwarding rule may specify, for example, that a packet received by the MWCD 102 via a certain port and having a certain public IP address (e.g., the public IP address associated with the CPE 104) as the packet's destination address is to be forwarded to the CPE 104 via a particular port using a private IP address associated with the CPE 104 as the destination address. It should be appreciated by those skilled in the art that the number of port forwarding rules provided to the MWCD 102 may depend on the number of CPEs, such as the CPE 104, to which messages are to be sent.

The OMA server 401 may provide the server 101 with the public IP address for the CPE 104 which, in exemplary embodiments, is the public IP address of the MWCD 102 plus a port number associated with the MWCD 102 corresponding to the port of the MWCD 102 set forth in the port forwarding rule. The server 101 uses the public IP address for the CPE 104 as a destination address in a header of a message that the server 101 is sending to the CPE 104 via the MWCD 102. The message may be used, for example, to enable the server 101 to diagnose a problem with the CPE 104. When the MWCD 102 receives IP packets corresponding to the message from the server 101 at the port associated with the port forwarding rule provided by the OMA server 401, the MWCD 102 uses the port forwarding rule to forward the IP packets to the CPE 104. It should be understood by those skilled in the art that the port forwarding rule may be provided by any device capable of communicating with the MWCD 102 and/or may be stored by the MWCD 102.

Figure 4:
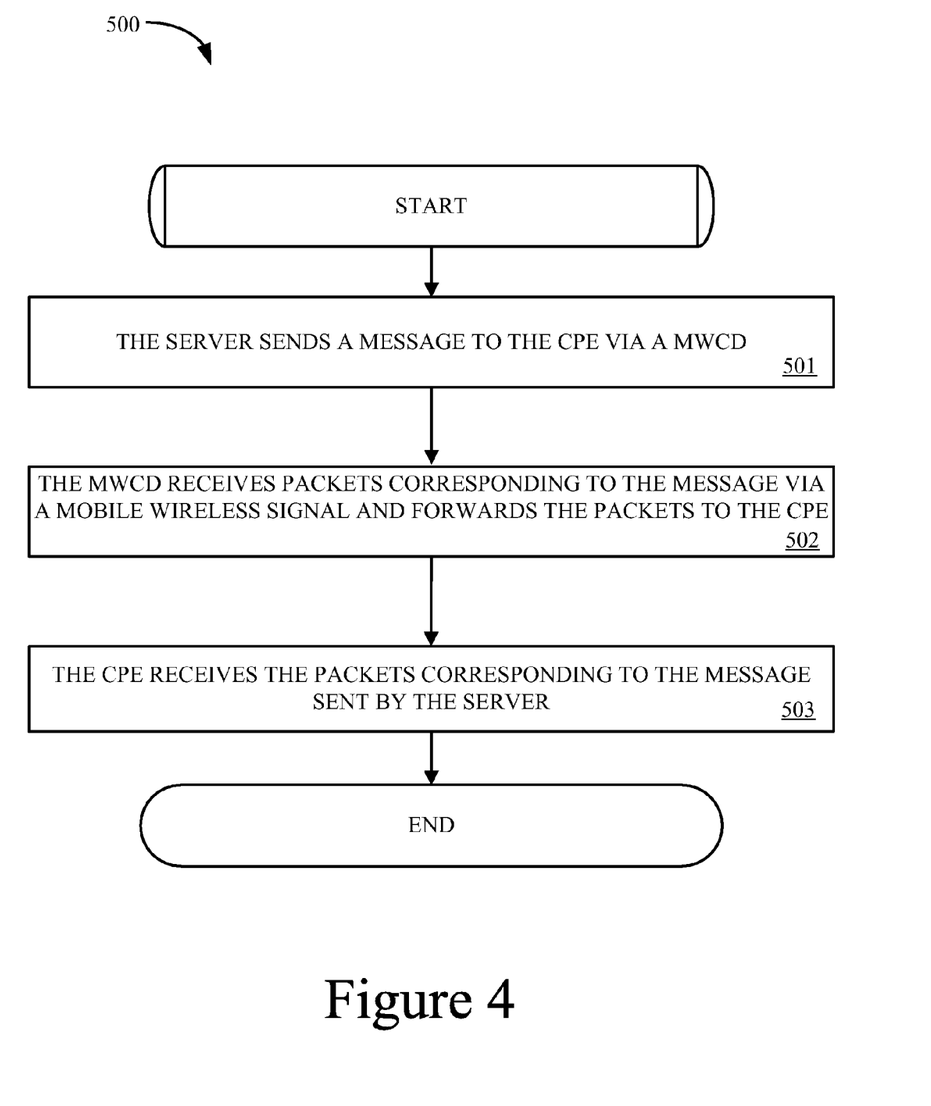
FIG. 4 is a flow chart illustrating a method for communicating via the mobile wireless communication device (MWCD) of FIG. 1, in accordance with exemplary embodiments.

FIG. 4 is a flow chart depicting a communication method 500, in accordance with exemplary embodiments. As indicated in box 501, the server 101 sends a message addressed to the CPE 104. The message may be transmitted via the communication networks 103, including a mobile wireless network. The MWCD 102 receives IP packets corresponding to the message via a mobile wireless signal and forwards the IP packets to the CPE 104, as indicated in box 502. The MWCD 102 and the CPE 104 are located at the customer premises 106. The MWCD 102 may forward the IP packets using a wireless LAN technology such as, for example, WiFi. The CPE 104 receives the IP packets corresponding to the message sent by the server 101, as indicated in box 503. Depending on the content of the message sent by the server 101, the CPE 104 may respond to the message by transmitting a response message to the server 101 via the MWCD 102. In exemplary embodiments, the message sent by the server 101 may be pursuant to a TR-069 protocol (or another remote device management industry standard specification) and may be configured to enable configuration and/or diagnosis of the CPE 104. The TR-069 protocol is hereby incorporated by reference in its entirety.

Figure 5:
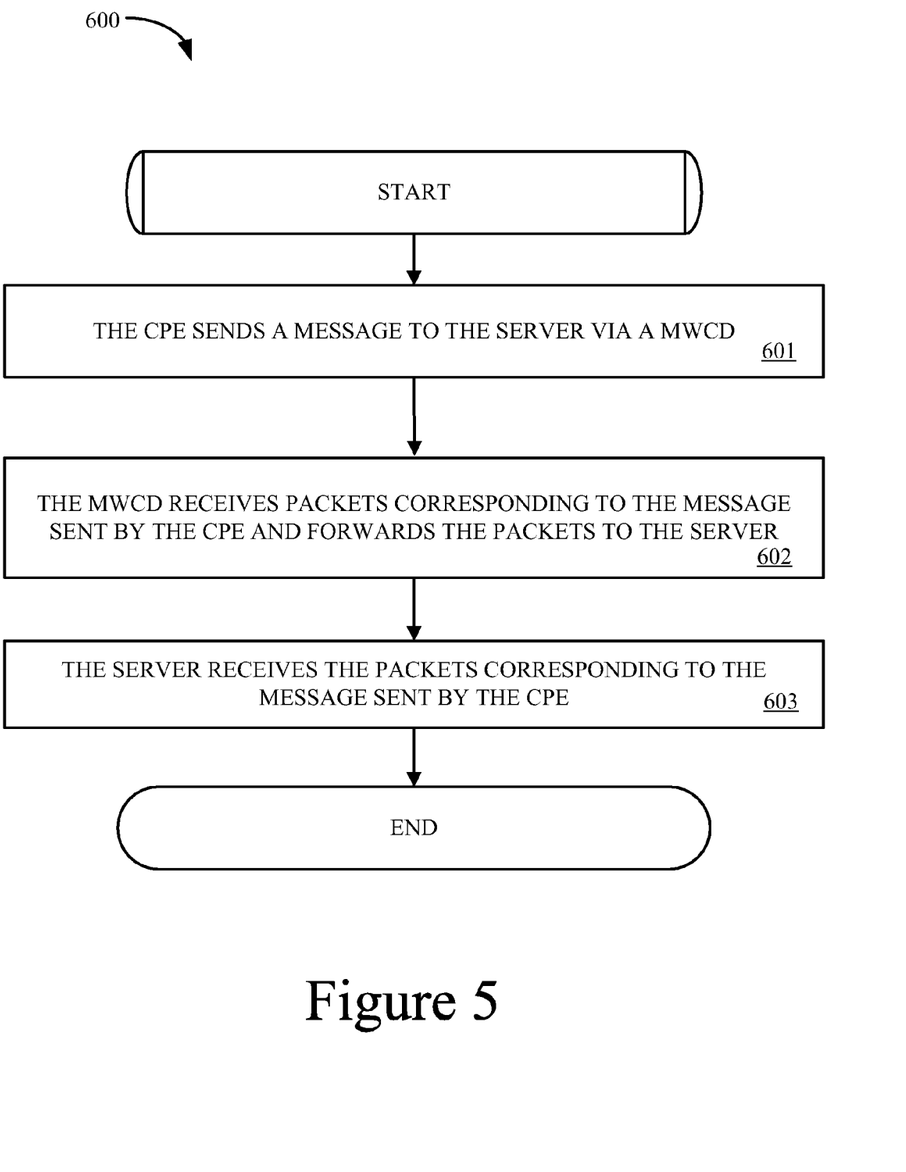
FIG. 5 is a flow chart illustrating another method for communicating via the MWCD of FIG. 1, in accordance with exemplary embodiments.

FIG. 5 is a flow chart depicting a communication method 600, in accordance with exemplary embodiments. As indicated in box 601, the CPE 104 sends a message addressed to the server 101. The message sent by the CPE 104 may be in response to a message received by the CPE 104 from the server 101. Alternatively, the CPE 104 may be initiating communication with the server 101. Circumstances under which the CPE 104 may initiate communication with the server 101 via the MWCD 102 include, for example, disruption of the CPE 104's wireline communication channel.

The MWCD 102 receives IP packets corresponding to the message sent by the CPE 104 and forwards the IP packets to the server 101, as indicated in box 602. The MWCD 102 may forward the IP packets to the server 101 via a mobile wireless communication channel. The server 101 receives the IP packets corresponding to the message sent by the CPE 104, as indicated in box 603. Depending on the content of the message sent by the CPE 104, the server 101 may respond to the message by transmitting a response message to the CPE 104 via the MWCD 102.

Figure 6:
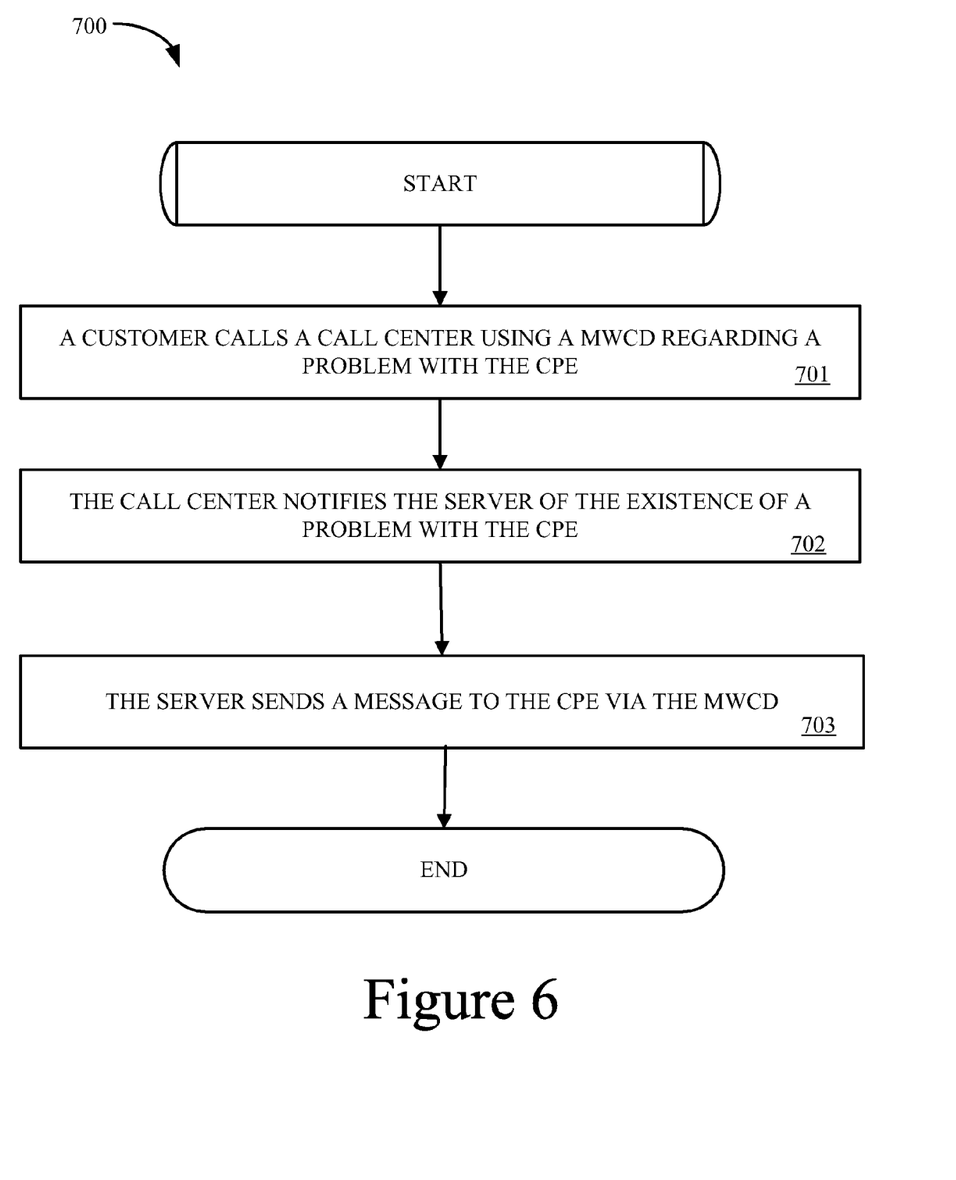
FIG. 6 is a flow chart illustrating yet another method for communicating via the MWCD of FIG. 1, in accordance with exemplary embodiments.

FIG. 6 is a flow chart depicting a communication method 700, in accordance with exemplary embodiments. As indicated in box 701, a customer calls a call center using the MWCD 102 or another communication device regarding a problem with the CPE 104. The problem may comprise, for example, a disruption in the CPE 104's wireline communication channel. After receiving the customer call, the call center notifies the server 101 of the existence of a problem with the CPE 104, as indicated in box 702. In other exemplary embodiments, the notification provided to the server 101 is indirect in that the call center may notify another device, which then notifies the server 101. According to exemplary embodiments, the notification provided to the server 101 includes information identifying the MWCD 102 through which the server 101 may transmit messages to the CPE 104. Responsive to receiving the notification of the existence of a problem related to the CPE 104, the server 101 sends a message to the CPE 104 via the MWCD 102, as indicated in box 703. The message may be configured to enable diagnosis and/or resolution of the problem related to the CPE 104.

Figure 7:
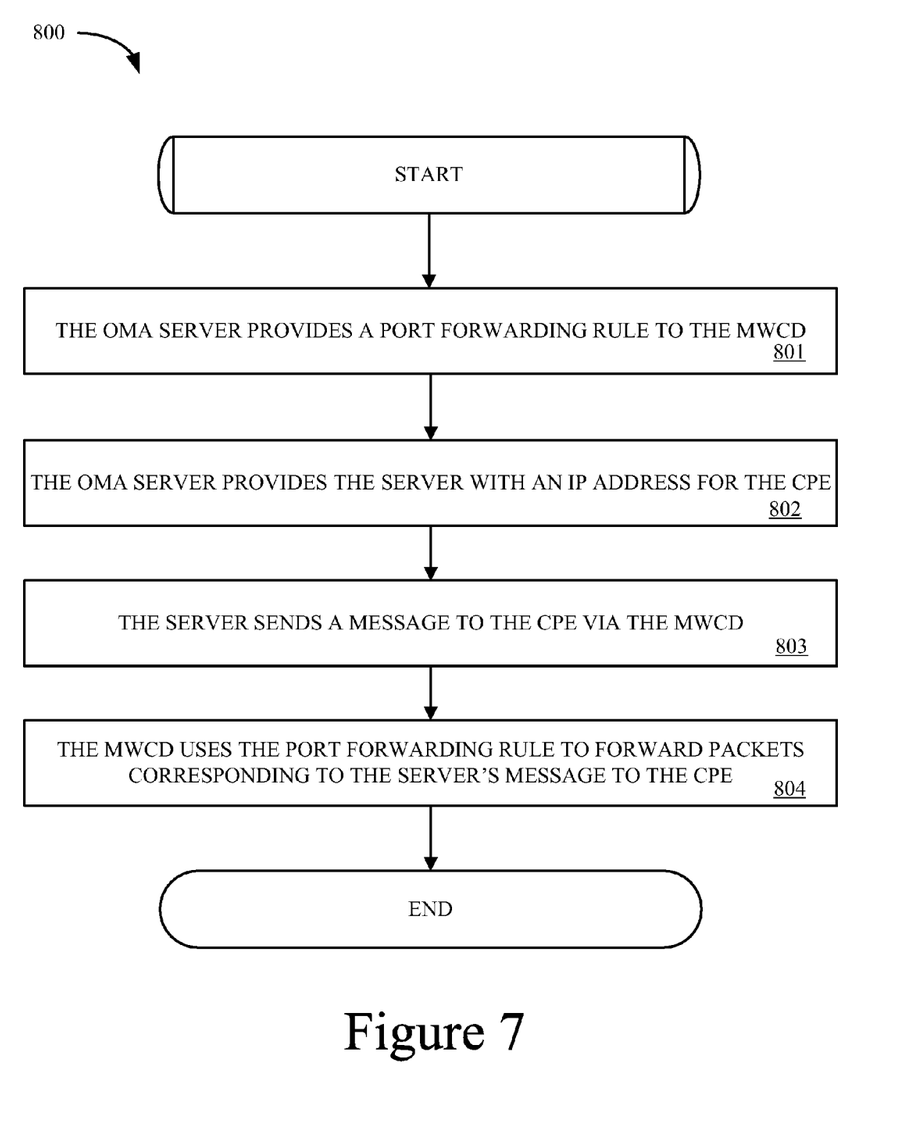
FIG. 7 is a flow chart illustrating a further method for communicating via the MWCD of FIG. 1, in accordance with exemplary embodiments.

FIG. 7 is a flow chart depicting a communication method 800, in accordance with exemplary embodiments. As indicated in box 801, the OMA server 401 provides a port forwarding rule to the MWCD 102. The port forwarding rule is configured to enable the MWCD 102 to forward to the CPE 104 IP packets corresponding to a message received by the MWCD 102 from the server 101. As previously discussed, the port forwarding rule may instruct the MWCD 102 that when a packet having a certain destination address is received via a particular port of the MWCD 102, such packet is to be forwarded to a private IP address associated with an intended CPE, such as the CPE 104. The OMA server 401 then provides the server 101 with an IP address for the CPE 104, as indicated in box 802. The server 101 uses the IP address for the CPE 104 as a destination address in a header of a message that the server 101 is to send to the CPE 104. The server 101 then sends a message to the CPE 104 via the MWCD 102, as indicated in box 803. The message may be used, for example, to enable the server 101 to diagnose a problem with the CPE 104. When the MWCD 102 receives IP packets corresponding to the message from the server, the MWCD 102 uses the port forwarding rule to forward the IP packets to the private IP address associated with CPE 104, as indicated in box 804.

Note that methods depicted in the exemplary flow charts described above may be modified to include fewer, additional, and/or different steps within the scope of this disclosure. Furthermore, steps depicted in the flow charts may be performed out of the order shown including substantially concurrently, in reverse order, or in a substantially different order.

Figure 8:
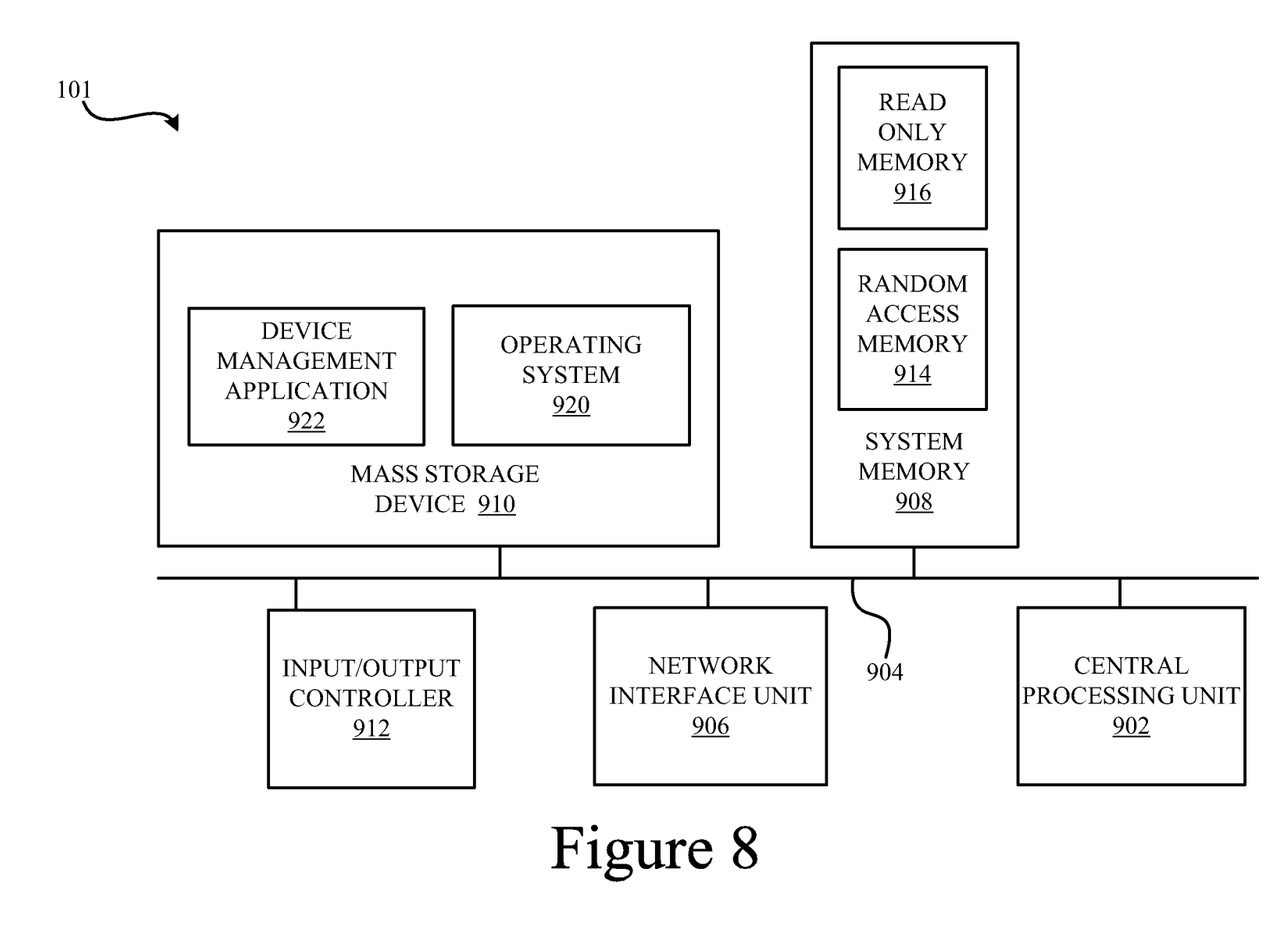
FIG. 8 is a block diagram illustrating the server of the communication system shown in FIG. 1, in accordance with exemplary embodiments.

FIG. 8 is a block diagram illustrating the server 101, in accordance with exemplary embodiments. The server 101 may be, for example, an auto-configuration server (ACS) or part of an ACS system. The server 101 includes a central processing unit 902 (CPU), a system memory 908, including a random access memory 914 (RAM) and a read-only memory (ROM) 916, and a system bus 904 that couples the memory 908 to the CPU 902. A basic input/output system containing the basic routines that help to transfer information between elements within the server 101, such as during startup, is stored in the ROM 916. The server 101 further includes a mass storage device 910 for storing an operating system 920 and other program modules, which will be described in greater detail below.

The mass storage device 910 is connected to the CPU 902 through a mass storage controller (not shown) connected to the bus 904. The mass storage device 910 and its associated computer-readable media provide non-volatile storage for the server 101. Although the description of computer-readable media contained herein refers to a mass storage device, such as a hard disk or CD-ROM drive, it should be appreciated by those skilled in the art that computer-readable media can be any available media that can be accessed by the server 101.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the server 101.

The server 101 may connect to the network 103 through a network interface unit 906 connected to the bus 904. It should be appreciated that the network interface unit 906 may also be utilized to connect to other types of networks and remote computer systems. The server 101 may also include an input/output controller 912 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 910 and RAM 914 of the server 101, including the operating system 920 suitable for controlling the operation of the server 101. The mass storage device 910 and RAM 914 may also store one or more program modules. In particular, the mass storage device 910 and the RAM 914 may store a device management application 922 configured to communicate with and/or manage the CPE 104 and/or 208. Functionality provided by the device management application 922 in connection with the MWCD 102 includes, for example, auto-configuration and dynamic service provisioning, software and firmware image management, status and performance monitoring, configuration of local and mobile wireless communication settings, and diagnostics. The device management application 922 may use, for example, the TR-069 protocol or another remote device management technical specification to communicate with the CPE 104 and/or 208. Other program modules may also be stored in the mass storage device 910 and utilized by the server 101.

Figure 9:
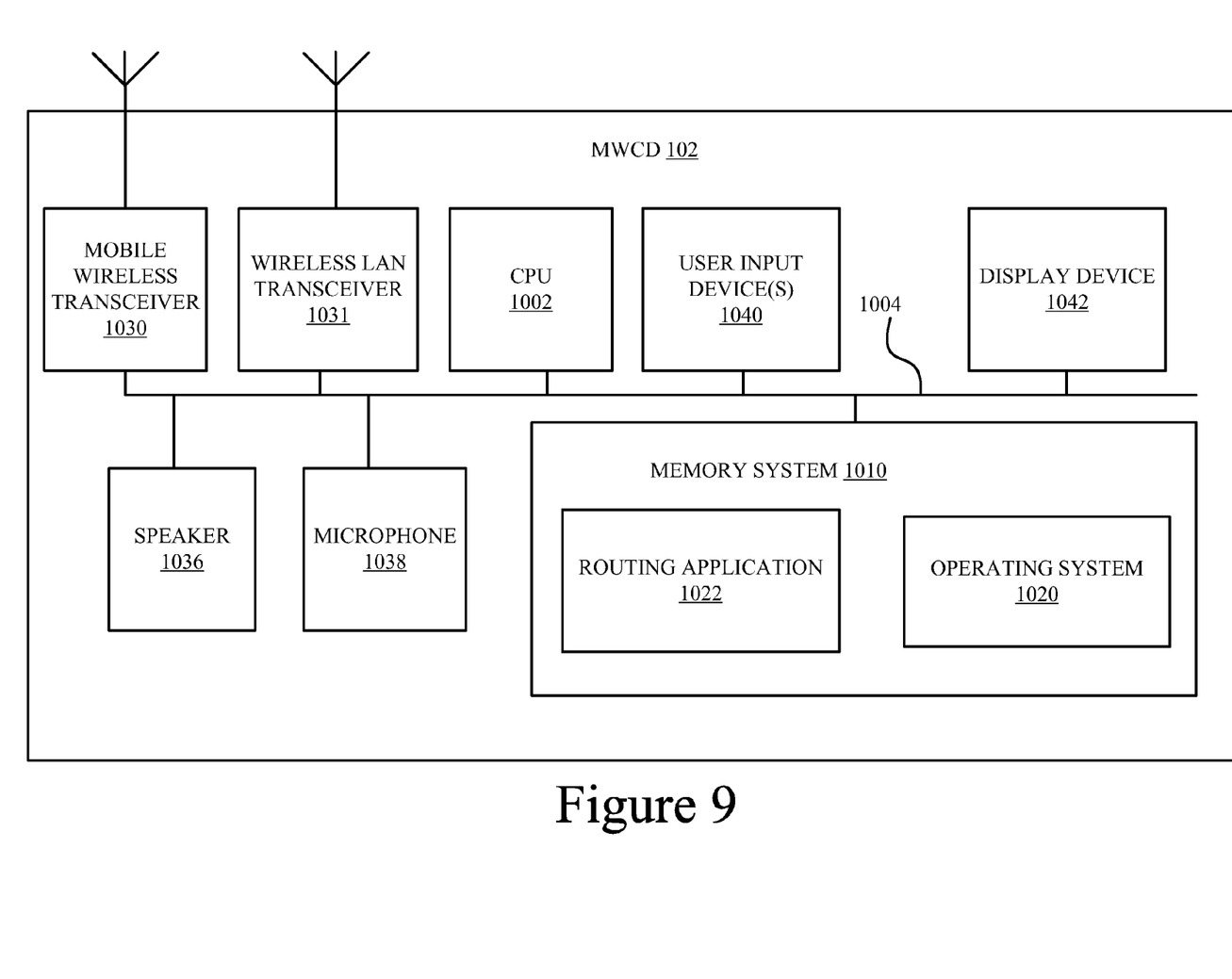
FIG. 9 is a block diagram illustrating the MWCD of the communication system shown in FIG. 1, in accordance with exemplary embodiments.

FIG. 9 is a block diagram illustrating the MWCD 102, in accordance with exemplary embodiments. The MWCD 102 may be, for example, a dual-mode UE. The MWCD 102 includes a central processing unit (CPU) 1002, a memory system 1010, a mobile wireless transceiver 1030, a wireless LAN transceiver 1031, a speaker 1036, a microphone 1038, one or more user input devices 1040, a display device 1042, and a local interface system 1004 that communicatively couples the aforementioned MWCD 102 components.

The user input devices 1040 may include, for example, user input buttons, a keyboard and/or a touch-screen input device. The display device 1042 may be, for example, among others, a liquid crystal display (LCD) device. The microphone 1038 is configured to receive voice signals from an MWCD 102 user, whereas the speaker is configured to output voice signals to the user.

According to exemplary embodiments, the mobile wireless transceiver 1030 is configured to receive and transmit mobile wireless signals such as via, for example, GSM or UMTS technology. The wireless LAN transceiver 1031 is configured to receive and transmit LAN wireless signals such as via, for example, WiFi technology. The MWCD 102 may connect to the networks 103 through the mobile wireless transceiver 1030 connected to the bus 1004.

The memory system 1010 is connected to the CPU 1002 through a memory controller (not shown) connected to the bus 1004. The memory system 1010 and its associated computer-readable media provide non-volatile storage for the MWCD 102. The computer-readable media can be any available storage media that can be accessed by the MWCD 102. By way of example, and not limitation, computer-readable media may include volatile and non-volatile, removable and non-removable media implemented in any method or technology for storage of information such as computer-readable instructions, data structures, program modules or other data.

A number of program modules and data files may be stored in the memory system 1010 of the MWCD 102, including an operating system 1020 suitable for controlling the operation of the MWCD 102. The memory system 1010 may also store one or more program modules. In particular, the memory system 1010 may store a routing application 1022 configured to route communications between the server 101 and the CPE 104. The functionality of the routing application may alternatively be implemented in hardware such as via an application specific integrated circuit (ASIC), in firmware, or using a combination of hardware, software and/or firmware.

When the routing application 1022 is in operation, the routing application 1022 routes communications between the server 101 and the CPE 104. For example, IP packets corresponding to a message transmitted by the server 101 are received via the transceiver 1030 and forwarded to the CPE 104 via the transceiver 1031. Similarly, IP packets corresponding to a message transmitted by the CPE 104 are received via the transceiver 1031 and forwarded to the server 101 via the transceiver 1030. The routing application 1022 may use a port forwarding rule as discussed above to implement the packet forwarding functionality. According to exemplary embodiments, the routing application 1022 supports network address translation (NAT) such that source and/or destination IP addresses as well as port numbers associated with the communications are rewritten as the communications pass through the MWCD 102.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A method for communicating via a mobile wireless communication device located at a customer premises, the method comprising:
   receiving, at a first server, a notification of a problem with a customer premises equipment co-located at the customer premises with the mobile wireless communication device;
   in response to receiving the notification, generating, at the first server, a message directed to the customer premises equipment located at the customer premises;
   receiving, at the first server, a public address for the customer premises equipment from a second server, the public address for the customer premises equipment comprising an address for the mobile wireless communication device and a port number corresponding to a particular port of the mobile wireless communication device at which received messages having the public address for the customer premises equipment are forwarded to the customer premises equipment;
   associating, at the first server, the message with the public address for the customer premises equipment;
   providing, from first the server, the message to the customer premises equipment via the mobile wireless communication device located at the customer premises utilizing the public address;
   wherein packets corresponding to the message are forwarded by the mobile wireless communication device to the customer premises equipment via another customer premises equipment; and
   wherein the message for the customer premises equipment located at the customer premises is configured to enable diagnosis of the problem, the problem being related to connection issues with the customer premises equipment.

2. The method of claim 1, wherein the mobile wireless communication device comprises a mobile telephone capable of communicating via a wireless local area network technology and a mobile wireless technology.

3. The method of claim 1, wherein the mobile wireless communication device receives packets corresponding to the message via a wireless signal transmitted via a mobile wireless technology and forwards the packets to the customer premises equipment via a wireless local area network technology.

4. The method of claim 3, wherein the mobile wireless technology is one of global system for mobile communications or universal mobile telecommunications system.

5. The method of claim 1, wherein the mobile wireless communication device uses a port forwarding rule to forward packets corresponding to the message to be sent to the customer premises equipment.

6. The method of claim 5, wherein the port forwarding rule instructs the mobile wireless communication device to forward the packets received at the particular port of the mobile wireless communication device and associated with the public address for the customer premises equipment to a private address associated with the customer premises equipment.

7. The method of claim 6, wherein the mobile wireless communication device implements the port forwarding rule responsive to port forwarding information received from a remote server.

8. A first server for communicating via a mobile wireless communication device located at a customer premises, the first server comprising:
   a processor; and
   memory comprising instructions that are executable by the processor, the instructions configured to enable the processor to:
      receive a notification of a problem with a customer premises equipment co-located at the customer premises with the mobile wireless communication device,
      in response to receiving the notification, generate a message directed to the customer premises equipment located at the customer premises,
      receive, from a second server, a public address for the customer premises equipment, the public address for the customer premises equipment comprising an address for the mobile wireless communication device and a port number corresponding to a particular port of the mobile wireless communication device at which received messages having the public address for the customer premises equipment are forwarded to the customer premises equipment,
      associate the message with the public address for the customer premises equipment,
      provide the message to be sent to the customer premises equipment via the mobile wireless communication device located at the customer premises utilizing the public address,
      wherein packets corresponding to the message are forwarded by the mobile wireless communication device to the customer premises equipment via another customer premises equipment, and
      wherein the message for the customer premises equipment located at the customer premises is configured to enable diagnosis of the problem, the problem being related to connection issues with the customer premises equipment.

9. The server of claim 8, wherein the mobile wireless communication device comprises a mobile telephone capable of communicating via a wireless local area network technology and a mobile wireless technology.

10. The server of claim 8, wherein the mobile wireless communication device receives packets corresponding to the message via a wireless signal transmitted via a mobile wireless technology and forwards the packets to the customer premises equipment via a wireless local area network technology.

11. The server of claim 10, wherein the mobile wireless technology is one of global system for mobile communications or universal mobile telecommunications system.

12. The server of claim 8, wherein the mobile wireless communication device uses a port forwarding rule to forward packets corresponding to the message to be sent to the customer premises equipment.

13. The server of claim 12, wherein the port forwarding rule instructs the mobile wireless communication device to forward the packets received at the particular port of the mobile wireless communication device and associated with the public address of the customer premises equipment to a private address associated with the customer premises equipment.

14. A computer-readable storage medium comprising instructions configured to enable a first server at least to:

receive a notification of a problem with a customer premises equipment co-located at the customer premises with the mobile wireless communication device;

generate a message directed to a customer premises equipment located at a customer premises, in response to receiving the notification;

receive, from a second server, a public address for the customer premises equipment, the public address for the customer premises equipment comprising an address for a mobile wireless communication device and a port number corresponding to a particular port of the mobile wireless communication device at which received messages having the public address for the customer premises equipment are forwarded to the customer premises equipment;

associate the message with the public address for the customer premises equipment;

provide the message to be sent to the customer premises equipment via the mobile wireless communication device, the mobile wireless communication device located at the customer premises;

wherein packets corresponding to the message are forwarded by the mobile wireless communication device to the customer premises equipment via another customer premises equipment; and wherein the message for the customer premises equipment located at the customer premises is configured to enable diagnosis of the problem, the problem being related to connection issues with the customer premises equipment.

15. The computer-readable storage medium of claim 14, wherein the mobile wireless communication device comprises a mobile telephone configured to receive the message via a wireless signal transmitted via a mobile wireless technology and to forward packets corresponding to the message to be sent to the customer premises equipment via a wireless local area network technology.

* * * * *